United States Patent [19]

Lyndon-James et al.

[11] Patent Number: 4,800,543
[45] Date of Patent: Jan. 24, 1989

[54] TIMEPIECE COMMUNICATION SYSTEM

[75] Inventors: Ross Lyndon-James; Alfred P. Gnadinger, both of Colorado Springs; Donald L. Black, Breckenridge; Carlos P. de Araujo, Colorado Springs, all of Colo.

[73] Assignee: Ramtron Corporation, Colorado Springs, Colo.

[21] Appl. No.: 128,550

[22] Filed: Dec. 3, 1987

[51] Int. Cl.$^4$ .............................................. G04B 47/00
[52] U.S. Cl. ...................................................... 368/10
[58] Field of Search .................... 368/10, 47, 155, 156, 368/185–187, 243; 364/569

[56] References Cited

U.S. PATENT DOCUMENTS

| | | | |
|---|---|---|---|
| 4,211,065 | 7/1980 | Schmitz et al. | 368/85 |
| 4,403,869 | 9/1983 | Crutcher | 368/10 |
| 4,511,259 | 4/1985 | Horiuchi | 368/10 |
| 4,624,578 | 11/1986 | Green | 368/10 |

Primary Examiner—Vit W. Miska
Attorney, Agent, or Firm—Edward D. Manzo

[57] ABSTRACT

A wristwatch contains communication and memory circuitry and a transmitter. The memory circuit stores a personal identification number of a single user. The communication and memory circuitry is driven by the same battery which powers the timekeeping structure of the watch. A transmitter transmits data from the reader to the wristwatch, placed proximate thereto. The reader has a keypad by which the user can enter a personal identification number, and the watch compares the transmitted number to the user-entered number. If the numbers match, a transaction may occur.

23 Claims, 6 Drawing Sheets

TIMEPIECE COMMUNICATION SYSTEM

FIELD OF THE INVENTION

The present invention relates to improvements in timepieces and systems for communication using timepieces.

BACKGROUND OF THE INVENTION

Credit cards are widely used throughout the world. They are formed typically of a plastic material and have an account identification number and customer name imprinted thereon. When making a purchase, the credit card is used to provide a physical imprint of the name and account information of the customer. The customer thereupon receives the goods which are purchased; the seller receives payment from the credit company or bank; and the customer is subsequently billed by the bank for the purchase. One variation of the credit card is the use of a magnetic stripe which contains the account information. This, however, does not always obviate the need for taking an imprint of the credit card during the purchase.

Engineers and corporations, located mainly outside the United States, are developing a new type of credit card referred to generally as a "smart-card." Each smart-card contains one or more integrated circuit chips, contacts to the circuitry on the chips, and frequently a power source such as a very thin battery. The chips on the smart-card usually include several hundred or thousand bytes of memory, and may even include a microprocessor. Some such cards include memory chips but no microprocessors, and have been referred to as "dumb-cards", whereas cards which do have processing capability have been called "chip-cards." In any event, such smart-cards can be used in making purchases and in other applications. In the purchasing environment, one application is "off-line shopping" in which a bank "charges up" or stores credits in memory on a particular card, and merchants thereafter subtract the purchase price at the point of purchase from the balance recorded on the card. Smart-cards have also been tested for medical records experiments wherein hospitals use cards to record visits to doctors.

Regardless of the application, smart-cards employ a physical communication link between the card and a cooperating system at the time of a transaction. This is inconvenient, and an object of the present invention is to avoid the necessity for a physical communication link between a "smart" device and a cooperating system.

It is another object of the present invention to provide an improved system comprising a memory chip or group of chips including memory and a cooperating reader.

Another object of the present invention is to provide an improved communication system which is simple to use.

Yet a further object of the present invention is to provide such a communication system which is housed in and attached to a wristband.

Another object of the present invention is to provide a further application for timepieces.

Still another object of the present invention is to adapt a digital wristwatch for use as a combined wristwatch and "smart-card" system.

It is also an object of the present invention to provide a new type of "smart-card" device with an improved communication system.

Wristwatches have previously been disclosed as being useful for paging operations. For example, European Patent Publication No. 184,606 ("Page Watch System Utilizing Time Slot Communication," published June 18, 1986) and W.I.P.O. International Publication WO86/03645 ("Watch Pager System And Communication Protocol," published June 19, 1986) disclose systems where a wristwatch includes substantial communication and processing circuitry and an antenna. However, while these publications indicate the feasibility of adding receiver circuitry to a wristwatch, they do not suggest the "smart-card" application or system of the present invention.

SUMMARY OF THE INVENTION

According to various aspects of the present invention, a timepiece, preferably a digital wristwatch, is housed together with a communication system and one or more integrated circuit chips providing memory capability and (optionally) processing capability. Preferably an actuator is provided so that a user may indicate to the timepiece communication system that a different mode of operation is being commenced. This may illustratively comprise a button.

After actuating the system, preferably the user inserts the timepiece into a chamber or device which has a cooperating communications system. The timepiece housing includes its own communications system, as mentioned, which preferably comprises an ultrasonic or infrared transmitter and receiver. Preferably the communication system in the timepiece is powered from the same battery used for powering the timepiece, although other power sources can be employed such as transmitting power to the timepiece from the cooperating communications system. The cooperating system, which may be called a "reader," in one application will include a keypad via which the user may enter a personal identification number. The reader will transmit to the timepiece this personal identification number entered by the user where the number will be compared to a personal identification number stored in the memory contained in the timepiece. If the user-entered identification number matches the stored identification number, then the system may proceed with a transaction. Otherwise, it can abort the transaction. The comparison will preferably occur in the timepiece itself, for security reasons. However, it is possible also for the comparison to occur in the reader, with the timepiece transmitting the stored number to the reader. This alternative introduces security problems however.

Applications of this system are not limited to purchase transactions where a personal identification number may be advantageously included, but may extend also to security access, providing medical information or other statistics and address other financial transactions such as obtaining funds from a cash machine. The system may function as a type of "lock and key" for entry to vehicles, offices, housing, or other secure locations.

BRIEF DESCRIPTION OF THE DRAWINGS

In describing a preferred embodiment of the present invention, reference is made to the accompanying drawings wherein like reference numerals represent like components and wherein.

DESCRIPTION OF A PREFERRED EMBODIMENT

Figure 1:
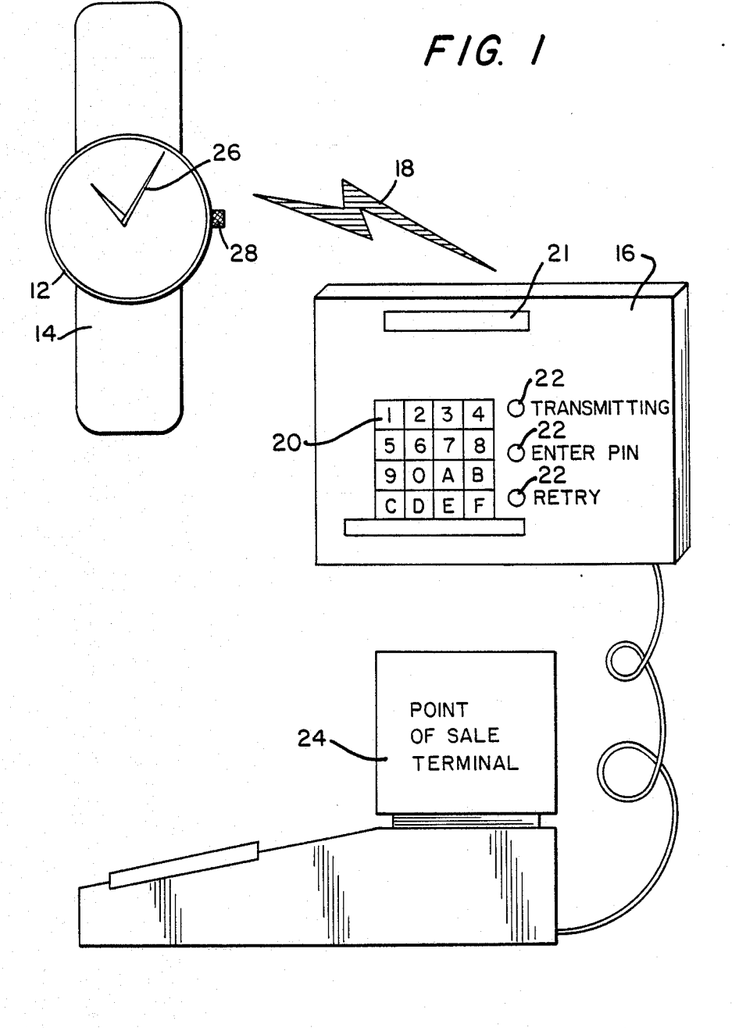
FIG. 1 represents the timepiece communication system and a cooperating reader according to the present invention.

Referring to FIG. 1, a timepiece case or housing 12 worn on a wristband 14 is shown in close proximity to a reader unit 16. A communication link represented at 18 is established between a housing 12 and a reader 16. The reader 16 includes a keypad 20, a digital alphanumeric display 21, as well as various indicator devices, such as pilot lights, 22. The reader 16 is electronically coupled to a point of sale terminal 24.

As seen in FIG. 1, a housing 12 includes an indicator device 26 for indicating the time of day. Although the indicator 26 is represented as the arms of a watch, it will be appreciated that any type of display device can be used for this function, including specifically digital display devices such as liquid crystal displays, within the scope of the present invention. Also seen in FIG. 1 is an actuator 28 which may comprise a push-button switch.

Figure 2:
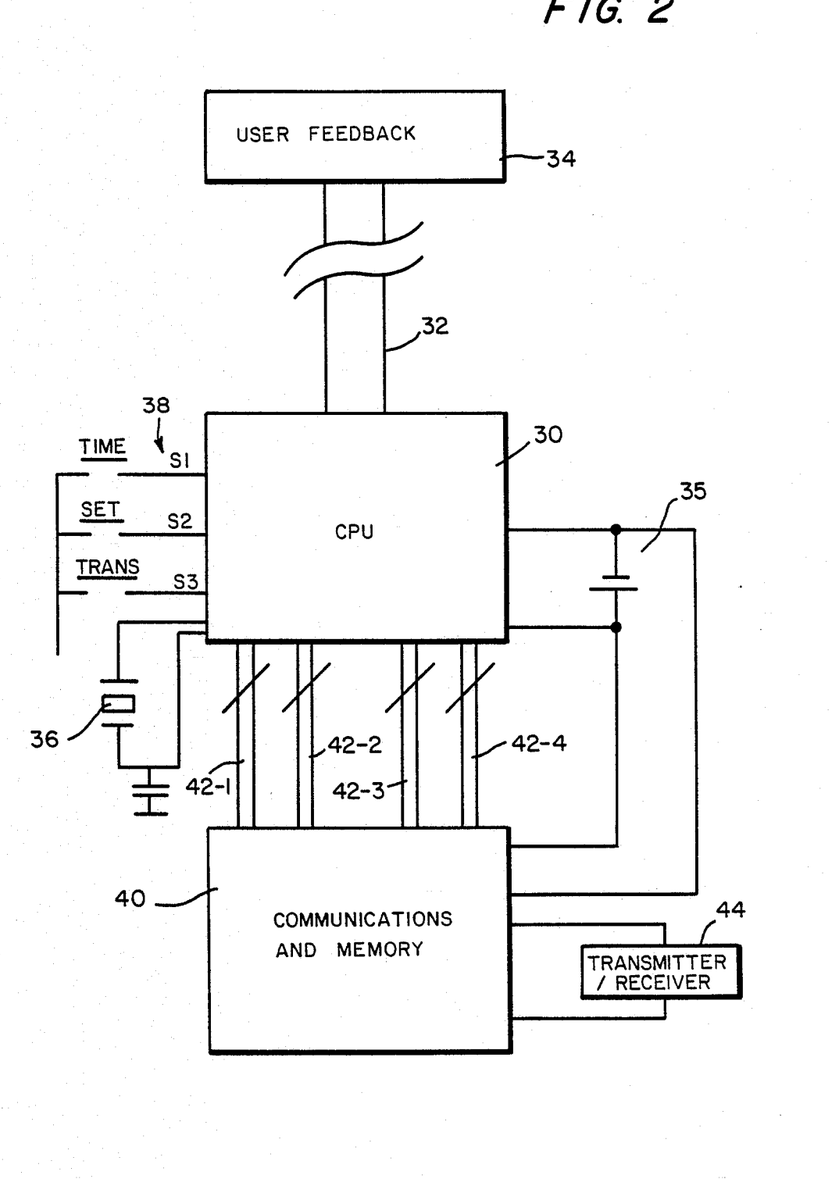
FIG. 2 in block form, circuitry included in the timepiece system of FIG. 1.

Referring to FIG. 2, the housing 12 may be used to contain a programmed timekeeping CPU 30, such as an LC5800 single-chip 4-bit microprocessor. The LC5800 is particularly suited for applications such as watches. The CPU 30 is coupled via a bus 32 to a user feedback apparatus 34 such as a digital display indicator 26 or other types of devices such as a sound enunciator for an alarm. The specific circuit used in the timekeeping function is not critical to the present invention, and any timekeeping apparatus can be used. Preferably, however, the timekeeping apparatus includes a battery 35. Coupled to the CPU 30 is a piezoelectric crystal 36 and various input switches 38 from the actuator 28, which may comprise three switches cyclically operated by a single button or other manipulable apparatus. A communications and memory circuit 40, which may be an integrated circuit chip, is coupled illustratively by buses represented as 42-1, 42-2, 42-3, and 42-4 to the CPU 30. A transmitting/receiving device 44 is coupled to circuit 40. The device 44 may be, for example, an ultrasonic transducer or an infrared LED transmitter, and can be a short range device. The particular type of transmitter selected is a matter of design choice. A piezoelectric transducer offers the advantage of being omni-directional, unlike an infrared LED. However, such a transducer tends to be noisier.

The circuit 40 includes both communication circuitry and memory circuitry. Preferably the memory circuitry is nonvolatile random access memory. Ferro-electric memory, which is nonvolatile, can be used alone or as a "shadow" to a volatile memory, such as a static RAM or a dynamic RAM. The specific type of memory can be varied within the scope of the present invention and is not critical. However, nonvolatile memory is preferred because it does not need constant power to preserve its data.

Figure 3:
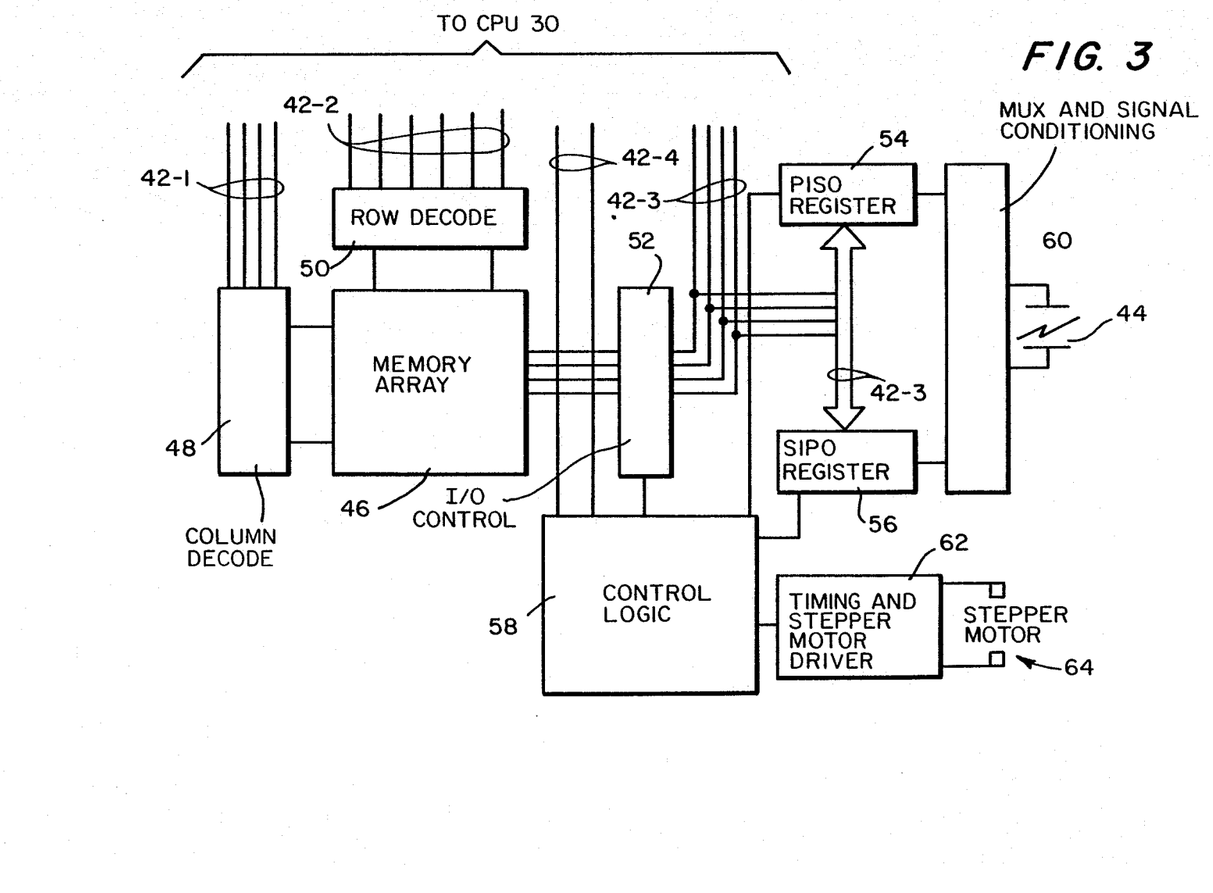
FIG. 3 illustrates, in block form, circuitry included in the communications and memory block of FIG. 2.

Referring also to FIG. 3, a detailed block diagram of the circuitry of the communications and memory circuit 40 is illustrated. A memory array block 46 includes 4K bits of memory partitioned in nonvolatile and volatile segments. Illustratively, the memory array is a 64×64 bit array. Since the CPU of the illustrated embodiment is a four bit microcomputer, the memory is arranged in four bit bytes with the four bits resident in a single row in four adjacent columns. Therefore, each row includes sixteen bytes. A column decode block 48 electrically couples the memory array block 46 with the CPU 30 over the bus 42-1 comprising four signal lines. Similarly, a row decode block 50 couples the memory array block 46 to the CPU 30 over data bus 42-2 comprising six signal lines. The column decode block 48 and the row decode block 50 are used to address a byte in memory by addressing one of the 64 rows and one of 16 bytes in the row. The four signal lines addressing the column decode block 48 are capable of addressing the 16 bytes, while the six signal lines to the row decode block 50 are capable of addressing the 64 rows.

A data bus 42-3 is coupled to the memory array block 46, an I/0 control block 52, a PISO register 54 and a SIPO register 56. Data is communicated over the data bus 42-3 between the CPU 30 and the circuit 40 in a four bit parallel fashion. A control logic block 58 is coupled to the I/0 control block 52 and to the CPU 30 over control bus 42-4. The control logic block 58 operates in conjunction with the CPU 30 to control the reading or writing of data to the memory array block 46.

The PISO register (mnemonic for parallel input serial output register) 54 receives four bit data to be transmitted from the watch, loads it in parallel, and transmits it out in serial fashion to a multiplexer and signal conditioning block 60. Block 60 is in turn coupled to the transmitter/receiver 44 previously discussed relative to FIG. 2, for transmitting data to the reader 16. The SIPO register (mnemonic for serial input parallel output register) 56 is also coupled to block 60 and receives data from the reader 16 through the transmitter/receiver 44 in serial fashion and converts it into four bit parallel data to be loaded into the memory array 46 or to have some computation performed upon it.

The multiplexer and signal conditioning block 60 generates synchronization signals, controls all of the communications protocol, filters noise or glitches on incoming lines for received data, and provides the current drivers for the piezoelectric transducer or infrared LED transmitter. The type of driver used is a function of the particular transmitter selected, as is well known.

An optional timing and stepper motor driver 62 is coupled to the control logic block 58. The driver block 62 is used for driving a stepper motor 64 for operating the analog type time indicating device 26. Accordingly, driver block 62 and stepper motor 64 are not required for a digital display watch.

Preferably the system illustrated in FIGS. 2 and 3 is used to transmit data to reader 16 (FIG. 1). However, it is also within the scope of the present invention that in addition to sending data to reader 16, power can be transmitted from reader 16 to an appropriate receptor coupled to the circuitry of FIGS. 2 and 3 to power the communications and memory operations during a transaction. Normally, though, it will not be necessary to transmit power from reader 16 because a standard watch battery 35 contains enough energy to power both the timekeeping function of CPU 30 as well as the communication and memory operations of the circuit 40. A standard 1.5 volt battery may contain approximately 475 joules of energy. If as much as 0.05 watts is dissipated for 100 milliseconds during each access, then each access would require 0.5 joules. This amounts to approximately 9,500 accesses, assuming no power is consumed by the timepiece. Even permitting watch currents of between one and three microamperes and some loss of efficiency in boosting the 1.5 volts to 5 volts, a large number of accesses can be allowed on using only a single 1.5 volt battery contained within housing 12.

The communication between circuits 40, 44 and reader 16 is not limited to any particular scheme. For example, frequency modulation can be used for transmitting data. If two frequencies near 100 kHz for digital representation are used, then assuming two nanoseconds per bit, over 65,000 bits of information could be transferred in 131 milliseconds. Alternatively, the oscillator used in a digital watch can be used. It typically operates at approximately 32 kHz.

Figure 4:
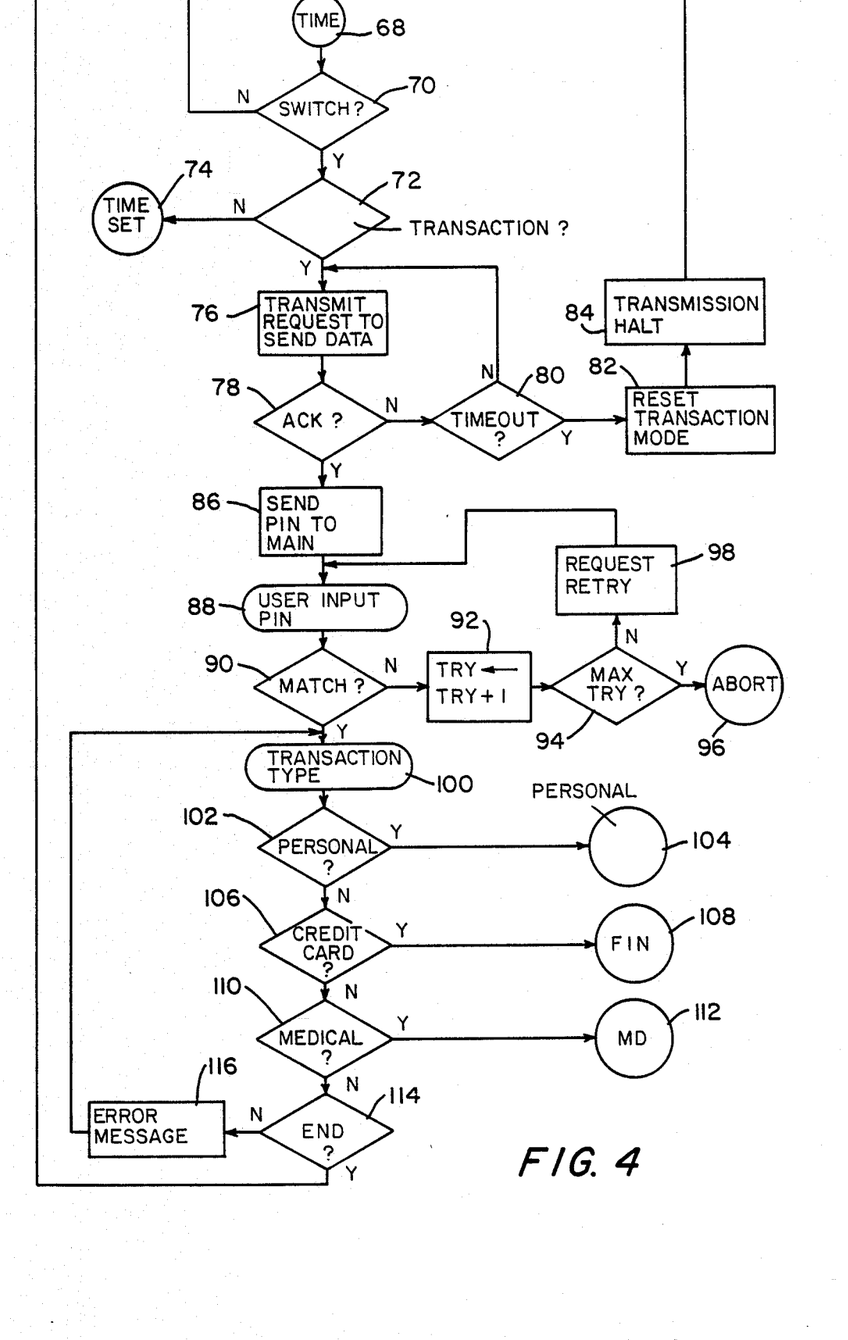
FIG. 4 illustrates a simplified software flowchart for use in the system.

FIG. 4 illustrates a flowchart 66 for using the system of FIGS. 1-3. The flowchart 66 begins at a time node 68 wherein the circuitry of FIG. 2 is being used for timekeeping. A decision block 70 determines whether the actuator 28 has provided any signal input. If no signal input is provided, then the circuitry continues keeping time. If, however, an actuation does occur, a further decision block 72 determines whether a transaction is to occur. This can be done by decoding switch signals from the actuator 28. For example, a single pulse can be used to indicate a transaction should occur, whereas a sequence of two rapid pulses may indicate a change in the time setting. If the decision block 72 determines that no transaction is to occur, control moves to a time setting operation at a node 74 wherein the time or date on the watch can be updated. Such a time setting operation is conventional in the art, and therefore will not be discussed in detail herein. If the transaction block 72 determines that a transaction is to occur, then, as indicated at operation block 76, the circuit 40 via transmitter 44 transmits a request to send data by illuminating an indicator 22 (see FIG. 1). This occurs in conjunction with the user inserting the watch housing 12 into or near the reader 16. This request to send data is sent over communication link 18 using, as mentioned, any form of communication such as ultrasonic, infrared, or radio, and using any modulation scheme which may be convenient. This step can be conveniently done without removing the system from the wrist of the user. The reader may be configured to allow the forearm or wrist of a user to be inserted into the reader to permit or ensure a good communication link between transmitter/receiver 44 and the corresponding circuits and devices in reader 16.

The communications and memory circuit 40 waits at a decision diamond 78 to receive an acknowledgment signal from the reader 16. If no acknowledgment signal has been received, a timeout decision diamond 80 determines whether the request has been waiting an unduly long period of time. If the timeout value has not been reached, then the control returns to the operation block 76. If the decision diamond 80 determines that an unreasonable length of time has passed with no acknowledgement being received, then a block 82 resets the transaction operation, and subsequently transmission is halted at block 84 and the control returns to the timekeeping function at the node 68.

If an acknowledgement is received, as determined at decision diamond 78, then a personal identification number stored in memory array 46 of circuit 40 is made available for comparison purposes, as indicated at operation block 86. An indicator 22 is illuminated at block 88 to instruct the user to enter his or her personal identification number via the keypad 20. This is a security measure to determine that the person using the device 12 actually is authorized by knowing the personal identification number stored in memory array 46. At decision diamond 90, the timepiece determines whether the user-entered personal identification number matches the transmitted personal identification number. As mentioned supra, this comparison can occur in circuitry in housing 12 if the data entered by the user to the reader 16 is transmitted to the housing 12, thereby providing better security. It will be understood that such security precautions can be eliminated, but with an increased risk of improper use of the system. If a match is not found at diamond 90, a TRY counter is incremented by one at a block 92, indicating the number of times a user has entered a personal identification number. A decision diamond 94 determines whether a maximum number of attempts has occurred. If the decision diamond 94 indicates an excessive number of unsuccessful attempts have been made to match personal identification numbers, the transaction operation is aborted at a node 96. If, however, the maximum number of attempts have not been realized, an indication is made via an indicator 22 at block 98 requesting the user to retry by entering the proper number, and control returns to block 88.

If the proper identification number is entered by the user, then the user is instructed at block 100 via the display 21 to enter on the keypad 20 a code indicating the type of transaction to be performed.

A decision diamond 102 determines whether the user has indicated that a personal type of transaction is to be executed. A personal transaction might relate, for example, to storing data personal to the user in memory for later reference. If a personal transaction is desired, then control advances to a node 104 to enter a subroutine therefor. Otherwise, a decision diamond 106 determines whether a credit card transaction has been requested. If a credit card transaction has been requested, then control moves to a node 108 to enter a subroutine therefor. Otherwise, a decision diamond 110 determines whether a medical transaction has been requested. If a medical transaction has been requested, then control moves to a node 112 to enter a subroutine therefor. If a medical transaction has not been requested, then a decision diamond 114 determines whether the transaction operation has been cancelled by the user, in which case the circuitry of FIGS. 2 and 3 returns to its timekeeping function at node 68. If, instead, the user has not cancelled the transaction, then an error message is generated at operation block 116 and the user is again requested to enter the transaction type at block 100.

While the flow chart in FIG. 4 indicates that the user can select various types of transactions, it should be appreciated that the flowchart could be modified in a single purpose application whereby only one such type of transaction can be utilized.

As the actual operation of the selected transactions at nodes 104, 108 and 112 is not material to the present invention, they will not be discussed in detail herein. Indeed, any such transaction could be custom programmed in memory to perform a desired transaction, such as complementing a credit purchase or for identifying patient expenses in a hospital application.

Figure 5:
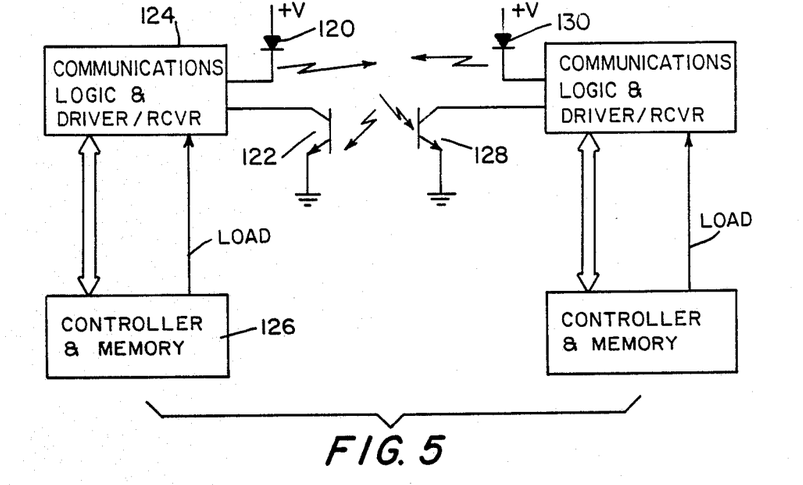
FIG. 5 is a general representation of an infrared communication link used in the preferred embodiment of the present invention.

FIG. 5 illustrates one example of a communication arrangement between the timepiece and reader 16. In this example, infrared light is used. It will be understood that this is representative, as mentioned, and that other data communication links, whether electromagnetic or otherwise, can be employed within the scope of the present invention.

FIG. 5 thus illustrates an infrared light emitting diode 120 and a detector 122 associated with the timepiece and corresponding to element 44 in FIGS. 2 and 3. Diode 120 and detector 122 are coupled to communications logic and driver circuitry 124 which is coupled to a controller and memory 126. It will be understood that generally block 124 represents portions of FIG. 3 and that block 126 represents portions of block 40 (FIG. 2). In FIG. 5, it can be seen that duplicate elements and circuitry are shown as part of the reader device 16. Thus, diode 120 transmits signals to a detector 128, and a corresponding diode 130 of the reader device transmits to detector 122.

Figure 6:
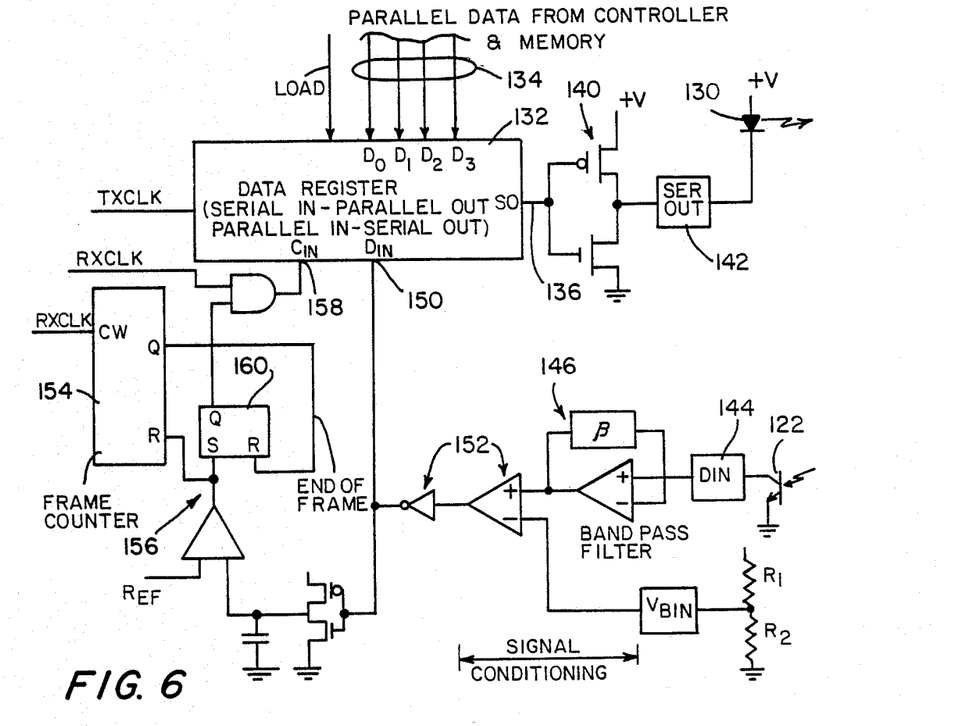
FIG. 6 shows further details of the circuitry supporting the infrared communication.

FIG. 6 shows portions of circuitry 124 in greater detail. The transmission is relatively straightforward in this example. Data is loaded in parallel to a data register 132, which corresponds to registers 54 and 56 in FIG. 3. Thus, data to be transmitted is inputted to register 132 via parallel lines 134, clocked by a transmitter clock 138, and is sent serially via an output 136 to a push-pull amplifier arrangement 140. A connector 142 is shown illustrating a connection from the on-chip circuitry to the external diode 130. The serial data, applied to the diode 130, which generates infrared electromagnetic radiation in accordance with the signal.

Concerning the reception of data, detector 122 is shown also in FIG. 6 coupled via another connector 144 to signal conditioning circuitry 146. Circuitry 146 includes a band pass filter. The output of circuitry 146 is shown in a waveform A in FIG. 7.

Figure 7:
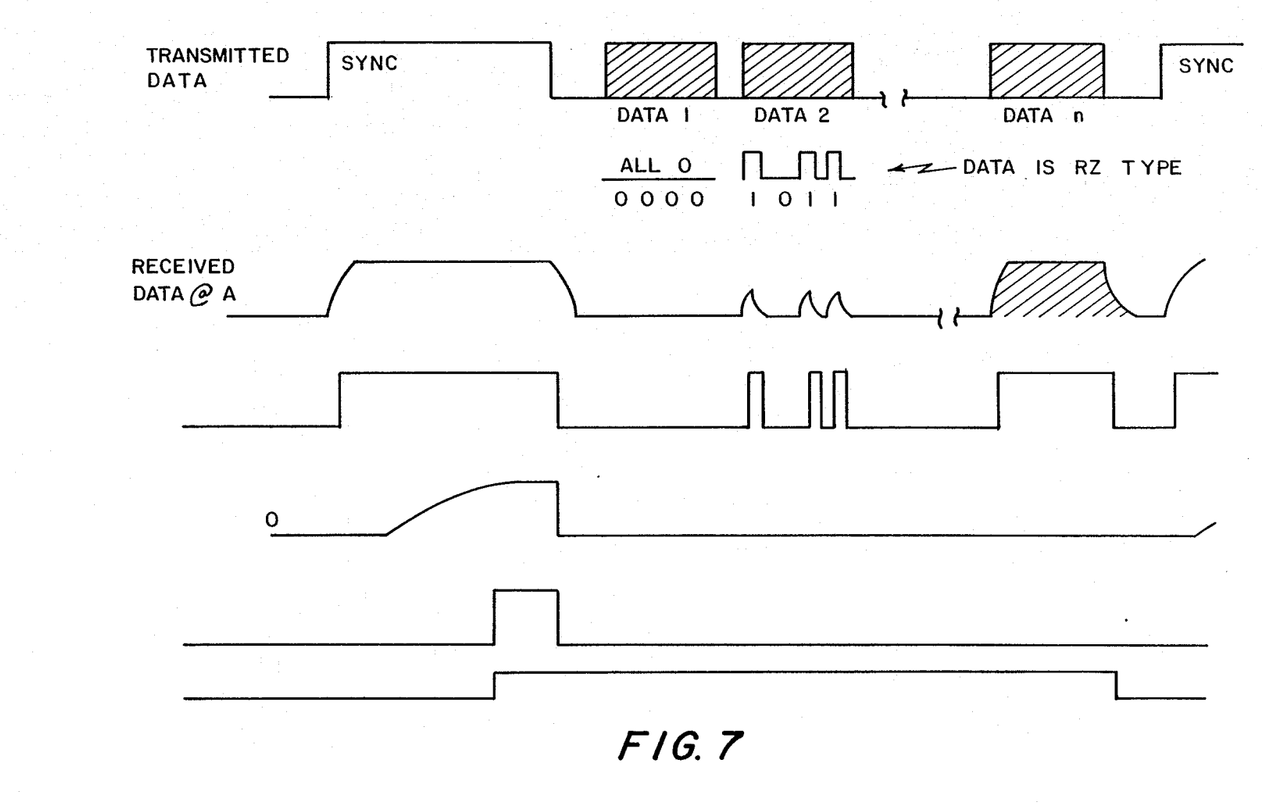
FIG. 7 represents waveforms occurring in FIG. 6.

The waveform A, noted in FIG. 6, is conditioned to provide a clean digital signal at a data input 150 of register 132 by appropriate circuitry 152. Waveforms B and C illustrate the signal as it passes through circuitry 152. Register 132 receives the data in serial form and supplies it in parallel form on the data bus 134.

Synchronization is accomplished by looking for a sync pulse and resetting a frame counter 154. Basically, the synchronization circuitry 156, which includes counter 154, operates from the same signal applied to data input 150 and generates a clock signal applied to a clock input 158 of register 132. Additional logic not shown herein can be used to determine when a nibble of data has become available, and loads it to the controller and memory within block 40 (FIG. 2).

FIG. 7 is merely illustrative of one data transmission protocol. The waveforms correspond to the points marked in FIG. 6. Waveform B is the output of a comparator or Schmitt trigger which cleans up the waveform considerably. Waveform C shows the RC time constant for sync detection. When this level rises to a preset trip point, a comparator output, shown in waveform B, goes high to set the flip-flop 160 in FIG. 6. This enables the clock to shift data into the register, and resets frame counter 154. Data will be clocked into register 132 until the frame counter 154 overflows, resetting flip-flop 160.

Thus, the invention broadly comprehends a multifunction time piece system for transmitting data between a time indication device and a remote reader device.

The foregoing disclosure is illustrative of the broad inventive concepts comprehended by the invention.

We claim:

1. A user operated multi-function timepiece system comprising:
   a housing;
   a time indication device mounted within or upon said housing;
   timekeeping apparatus coupled to said time indication device;
   a power source coupled to said timekeeping apparatus;
   integrated circuitry including memory and a communication circuit coupled to said battery and located within said housing, said memory including unique data for each respective user;
   a transmitter coupled to said integrated circuitry and located within said housing for transmitting data to a location outside said housing;
   a reader device including a receiver arranged to receive signals transmitted by said transmitter;
   a keypad coupled to said receiver; and means for comparing information entered via said keypad with data from said memory.

2. The system of claim 1 further including a receiver coupled to said integrated circuitry in said housing.

3. The system of claim 1 wherein said housing comprises a wristwatch housing which is worn on a wristband.

4. The system of claim 1 wherein said timekeeping apparatus comprises a programmed microprocessor.

5. The system of claim 1 wherein said integrated circuitry normally operates in conjunction with said timekeeping apparatus in a timekeeping operation, and further including means coupled to said timekeeping apparatus for causing said apparatus and circuitry to switch to a transaction operation.

6. The system of claim 5 wherein said means for causing comprises a switch mounted to said housing for actuation by a user.

7. The system of claim 1 wherein said transmitter comprises a piezoelectric transducer.

8. The system of claim 1 wherein said transmitter comprises an infrared transmitter.

9. The system of claim 1 further comprising an enclosure housing said reader device and said keypad, and wherein said comparing means is coupled to said reader device and said keypad within said enclosure.

10. The system of claim 2 wherein said comparing means is located within said housing, and said reader device includes a transmitter to transmit information entered via said keyboard to said receiver coupled to said integrated circuitry.

11. The system of claim 1 wherein said reader device is coupled to a point of sale terminal, and wherein said memory includes transaction data and said transmitter transmits transaction data from said integrated circuitry to said point of sale terminal to enable a user to complete a transaction.

12. A user-operated time piece communication system comprising:
    a wristwatch housing;
    a time indication device mounted to said housing;
    a programmed central processing unit (CPU) in said housing coupled with said time indication device to indicate time thereon;

a memory circuit in said housing coupled to said CPU, said memory circuit storing unique data for each respective user;

a communications circuit in said housing coupled to said CPU and said memory circuit;

a transmitter in said housing coupled to said communication circuit for transmitting data to a location remote from said housing;

a receiving device in an enclosure remote from said housing arranged to receive signals transmitted by said transmitter;

a keypad coupled to said receiving device; means mounted in said enclosure for indicating to a respective user to enter data on said keypad; and means for comparing information entered via said keypad with data stored in said memory.

13. The system of claim 12 further including a receiver coupled to said communications circuitry in said housing.

14. The system of claim 12 wherein said CPU normally performs a timekeeping operation, and further including means coupled to said CPU for causing said CPU to switch to a transaction operation.

15. The system of claim 14 wherein said means for causing comprises a switch mounted to said housing for actuation by a user.

16. The system of claim 12 wherein said transmitter comprises a piezoelectric transducer.

17. The system of claim 12 wherein said transmitter comprises an infrared transmitter.

18. The system of claim 12 wherein said means for comparing is coupled to said receiving device and said keypad within said enclosure.

19. The system of claim 13 wherein said means for comparing is located within said housing, and further comprising a transmitter in said enclosure coupled to said keypad to transmit information entered via said keypad to said receiver coupled to said communication circuitry.

20. The system of claim 12 wherein said receiving device is coupled to a point of sale terminal, and wherein said memory includes transaction data and said transmitter transmits transaction data from said memory circuitry to said point of sale terminal to enable a user to complete a transaction.

21. A method of performing a transaction comprising the steps of:

providing a wrist mounted timekeeping device including:
  a memory storing unique data for each respective user,
  a communications circuit coupled to said memory, and
  a transmitter coupled to said communications circuitry for transmitting data from said memory;

providing a receiving device arranged to receive signals transmitted by said transmitter;

placing said timekeeping device in close proximity with said receiving device;

actuating a switch circuit coupled to said timekeeping device for indicating that a transaction is to be performed;

instructing a user to enter data using a keypad coupled to said receiving device; and comparing information entered via said keypad with information stored in said memory for enabling the transaction to be completed.

22. The method of claim 21 further comprising the step of transmitting data stored in said memory to said receiving device.

23. The method of claim 21 further comprising the step of requesting a user to select a type of transaction to be performed.

* * * * *